Patented Feb. 24, 1925.

1,527,715

UNITED STATES PATENT OFFICE.

CARL THIEME, OF ZEITZ, GERMANY.

INSECT-CATCHING GLUE.

No Drawing. Application filed April 25, 1922. Serial No. 556,406.

*To all whom it may concern:*

Be it known that I, CARL THIEME, a citizen of the German Republic, and a resident of Zeitz, Germany, have invented certain new and useful Improvements in an Insect-Catching Glue, of which the following is a specification.

The insect catching glue produced until now with resins, glycerines, unsaturated aliphatic acids, turpentine and caoutchouc have the disadvantage, that they become hard within a short time and lose their adhesive properties.

It has been ascertained now by the use of halogenically substituted natural or synthetic caoutchouc the desired adhesive property can be obtained. The caoutchouc itself becomes ineffective very quickly by oxydation, the chlorinated products however retain permanently their catching property.

The solution of chlorin-caoutchouc in nonvolatile solvents permanently retains a strong catching property and furthermore is fully waterproof and weatherproof. For the production of catching glues, according to the present invention, a solution of chlorin-caoutchouc, preferably in chlorinated fat oils, or in other nonvolatile solvents, as for instance chlorparaffins, slowly drying oils or resins are employed.

*Example.*

Two parts Hevea-caoutchouc are dissolved in 40 parts carbon tetrachloride ($CCl_4$) and then chlorinated by slowly introducing chlorin into said solution, until the lather does not absorb any further chlorin.

100 parts cotton-oil are chlorinated at 700° C., up to an increase of weight of 30% and to the product thus obtained the above-mentioned solution of chlorin-caoutchouc is added whereupon the carbon tetrachlorid is removed by evaporation.

Having thus particularly described the nature of my invention, what I claim as new and desire to secure by Letters Patent of the United States is:

1. Insect catching glue consisting of a solution of halogenically substituted caoutchouc in a nonvolatile solvent having a molecular weight of at least 250 and boiling at over 200° C.

2. Insect-catching glue consisting of a solution of halogenically substituted caoutchouc in chlorinated oil.

3. Insect-catching glue consisting of a solution of halogenically substituted caoutchouc in chlorinated cotton oil.

In testimony whereof I affix my signature in presence of two witnesses.

CARL THIEME.

Witnesses:
K. MIER,
OTTO KIRSCH.